United States Patent
Nojiri et al.

(10) Patent No.: US 7,576,937 B2
(45) Date of Patent: Aug. 18, 2009

(54) DISK DRIVE AND CONTROL METHOD THEREFOR

(75) Inventors: Sayaka Nojiri, Kanagawa (JP); Nobuhiko Wasa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/788,712

(22) Filed: Apr. 20, 2007

(65) Prior Publication Data
US 2007/0247743 A1    Oct. 25, 2007

(30) Foreign Application Priority Data
Apr. 21, 2006    (JP)    ............... 2006-117348

(51) Int. Cl.
*G11B 21/02*    (2006.01)
*G11B 5/596*    (2006.01)

(52) U.S. Cl. ..................... 360/75; 360/78.04
(58) Field of Classification Search .............. None
See application file for complete search history.

(56) References Cited

U.S. PATENT DOCUMENTS 6,995,945 B2    2/2006   Kohso et al.
2003/0035240 A1*    2/2003   Takeuchi et al. ......... 360/78.06
2007/0279797 A1*    12/2007   Hansen et al. ........... 360/78.14
2008/0030891 A1*    2/2008   Kim et al. ................ 360/78.06

FOREIGN PATENT DOCUMENTS

JP    09-091901    4/1997
JP    2005293839    10/2005

* cited by examiner

*Primary Examiner*—Andrew L Sniezek
(74) *Attorney, Agent, or Firm*—Townsend and Townsend and Crew LLP; Darren Gold

(57) ABSTRACT

Embodiments in accordance with the present invention provide a disk drive capable of verifying whether the speed of an actuator is true or not, the speed being detected while the actuator is being moved between a retracted position and a recording surface of a magnetic disk, and to provide a control method for controlling the disk drive. In a particular embodiment, a hard disk drive (HDD) comprises: a head for accessing a disk; an actuator for supporting the head, the actuator being driven by a voice coil motor (VCM); a speed monitor for, on the basis of a cylinder ID written to the disk, monitoring the speed of the actuator while the actuator is being moved between a ramp which is provided outside a data area of the disk and the data area; and a speed verifier for, if an abnormal speed condition of the actuator is detected by the speed monitor, verifying the abnormal speed condition on the basis of the counter electromotive voltage of the VCM. If the speed based on the counter electromotive voltage is also abnormal, the speed verifier records the speed as the overspeed.

13 Claims, 4 Drawing Sheets

DISK DRIVE AND CONTROL METHOD THEREFOR

CROSS-REFERENCE TO RELATED APPLICATION

The instant nonprovisional patent application claims priority to Japanese Patent Application No. 2006-117348 filed Apr. 21, 2006 and incorporated by reference in its entirety herein for all purposes.

BACKGROUND OF THE INVENTION

Devices using various types of media such as optical discs, magnetic optical discs, and flexible magnetic disk are known in the art as data storage devices. Among them, hard disk drives (hereinafter referred to as HDDs) have become popular as storage devices for computers, to such an extent that they are one of the storage devices indispensable for modern computer systems. Further, not limited to the computers as described above, HDDs are becoming more and more widely used in various applications. For example, HDDs are used for video recording/reproducing devices, car navigation systems, cellular phones, and removable memories for use in digital cameras.

A magnetic disk used in the HDD has a plurality of data tracks that are concentrically formed. A plurality of pieces of servo data each having address information, and a plurality of data sectors each including user data, are written to each data track. A plurality of data sectors are written between servo data areas. A desired data sector is accessed based on the address information of the servo data by use of a head element of a head slider supported by an actuator that is pivotally moved by a voice coil motor (VCM). This makes it possible to write data to the data sector or to read data from the data sector.

When the magnetic disk is being stopped, the actuator and the head slider are retracted to a retracted position. As a method for retracting the head slider, the load/unload method and the CSS (Contact Start Stop) method are known. For the load/unload method, the operation of moving a head from a ramp to a recording surface of a disk is called loading (head load), whereas the operation of retracting the head to a retracted position of the ramp is called unloading (head unload).

While the actuator is being moved between the retracted position and the recording surface of the magnetic disk, the HDD controls the pivotal movement of the actuator by controlling the speed of the VCM. To be more specific, a VCM speed detection circuit detects the VCM speed by use of the counter electromotive voltage of the VCM. A controller supplies the VCM with the VCM current so that a value of the detected VCM speed becomes a target value.

Here, during loading of the head, in order to avoid the damage to the head and the disk, the actuator is controlled so that the speed of the actuator is kept constant. For example, Japanese Patent Laid-Open No. 2005-293839 ("Patent Document 1") discloses a storage device in which a correction coefficient used to convert the counter electromotive voltage into the correct moving speed is acquired for correction-coefficient calibration so that the moving speed detected by using the counter electromotive voltage coincides with the moving speed of an actuator, which is calculated from position information of a disk.

When the head is moved from the ramp to the disk, and consequently it becomes possible to stably read out position information, the load operation is completed. Then, the storage device starts seek operation of actually positioning the head to a target position on the disk. To be more specific, upon the completion of the load operation, it is possible to switch the speed control based on the counter electromotive voltage of the VCM to the positioning control based on servo information.

Incidentally, the damage may occur to the head and the disk in the HDD by various kinds of causes. As one of cause analyses, whether or not the load speed is faster than the target speed is detected to judge that the damage has occurred during the loading. If the load speed is faster than the target speed, the number of times of overspeeding and the overspeed are written to a specified area on the disk, the specified area being provided outside a data area to which user data is written. The number of times of overspeeding, the overspeed, and the like, which have been written, are used for failure analysis thereafter.

Until the head is loaded on the recording surface of the disk from the retraction area, it is not possible to read out position information written to the disk. In addition, unless it becomes possible to stably read out the position information, it is not possible to switch to the positioning control of the head based on the position information (servo information). For this reason, heretofore, for example, after it becomes possible to read out servo information, if servo data is successfully detected the specified number of times, switching to the control based on servo information is performed. Then, on the basis of the result of reading out servo data at the time of loading, the result being obtained before switching to the control based on servo information, the speed of the actuator is detected to perform abnormal speed detection.

However, even if an abnormal speed condition is detected on the basis of the result of reading out servo data at the time of loading, it is not possible to distinguish an abnormal speed condition caused by the damage to the disk or the head from an abnormal speed condition that is detected as a result of a failure to correctly read out servo data. Therefore, it is not possible to know whether information written as the abnormal speed condition is true or not.

BRIEF SUMMARY OF THE INVENTION

Embodiments of the present invention provide a disk drive capable of verifying whether the speed of an actuator is true or not, the speed being detected while the actuator is being moved between a retracted position and a recording surface of a magnetic disk, and to provide a control method for controlling the disk drive. As specifically illustrated in FIGS. 1-3, an embodiment of a hard disk drive 1 in accordance with the present invention comprises: a head for accessing a disk 11; an actuator 16 for supporting the head, the actuator 16 being driven by a VCM 15; a speed monitor 233 for, on the basis of a cylinder ID written to the disk 11, monitoring the speed of the actuator 16 while the actuator 16 is being moved between a ramp 17 which is provided outside a data area of the disk 11 and the data area; and a speed verifier 232 for, if an abnormal speed condition of the actuator 16 is detected by the speed monitor 233, verifying the abnormal speed condition on the basis of the counter electromotive voltage of the VCM 15. If the speed based on the counter electromotive voltage is also abnormal, the speed verifier 232 records the speed as the overspeed.

DETAILED DESCRIPTION OF THE INVENTION

Embodiments in accordance with the present invention have been devised to solve the above problems. Specifically, embodiments in accordance with the present invention relate to a disk drive that is capable of detecting an abnormal speed condition of an actuator while the actuator is being moved between a data area and a retraction area outside the data area, and to a control method for controlling the disk drive.

Embodiments of the present invention provide a disk drive capable of verifying whether the speed of an actuator is true or not, the speed being detected while the actuator is being moved between a retracted position and a recording surface of a magnetic disk, and to provide a control method for controlling the disk drive.

In order to achieve the above-described goal, according to one embodiment of the present invention, a disk drive comprises: a head that accesses a disk; an actuator that supports the head and is driven by a voice coil motor; a speed monitor that monitors, on the basis of position information written to the disk, the speed of the actuator while the actuator is being moved between a retraction area provided outside a data area of the disk and the disk; and a speed verifier that verifies, if an abnormal speed condition of the actuator is detected by the speed monitor, whether the abnormal speed condition is true or not.

According to an embodiment of the present invention, the speed of the actuator is monitored while the actuator is being moved between the retraction area and the disk. Accordingly, if an abnormal speed condition is detected, the result of the speed detection can be improved in reliability by further verifying whether the abnormal speed condition is true or not.

In addition, on the basis of whether or not position information written to the disk is successfully read out by the head, the speed verifier can verify whether the abnormal speed condition is true or not. Therefore, if the reading is failed, it is possible to judge that the detected speed is not reliable.

Moreover, the disk drive further includes a motor driver for controlling the voice coil motor on the basis of the counter electromotive voltage of the voice coil motor. Therefore, if an abnormal speed condition is detected, the speed verifier can verify on the basis of the counter electromotive voltage whether the abnormal speed condition is true or not. Thus, the detection speed based on the position information can be verified on the basis of the counter electromotive voltage.

Further, the speed verifier can store the speed as the abnormal speed on the basis of the result of the verification. Therefore, it is possible to perform the failure analysis, or the like, on the basis of the stored abnormal speed with high reliability, the stored abnormal speed having been subjected to verification.

In addition, a ramp which is provided outside the disk can be used as the retraction area. Accordingly, in the disk drive that adopts the load/unload method, it is possible to detect an abnormal speed condition during loading/unloading of the actuator.

Moreover, the speed monitor can monitor the speed of the actuator while position information written to the disk is read out the specified number of times with the head being moved from the retraction area. Therefore, it is possible to detect an abnormal speed condition during the load operation while the position information is read out the specified number of times.

Furthermore, on the basis of the position information, the speed monitor monitors the speed of the actuator as a first speed. On the other hand, the speed verifier detects a second speed on the basis of the counter electromotive voltage. If both of the first speed and the second speed exceed a reference value, it is possible to record the first speed as the abnormal speed. By recording the detected speed only when both the speed detected on the basis of the position information and the speed detected on the basis of the counter electromotive voltage are abnormal, it is possible to acquire information about an abnormal speed condition whose cause is probably not a failure to read out position information but the damage to the head or the disk.

According to another embodiment of the present invention, a disk drive comprises: a head that accesses a disk; an actuator that supports the head and is driven by a voice coil motor; a speed monitor that monitors the speed of the actuator while the actuator is being moved between a retraction area provided outside a data area of the disk and the disk; and a speed verifier that verifies, if an abnormal speed condition of the actuator is detected by the speed monitor, whether the abnormal speed condition is true or not, wherein: the speed monitor monitors the speed of the actuator on the basis of either one of position information written to the disk and the counter electromotive voltage of the voice coil motor, and the speed verifier verifies on the basis of the other of them whether the abnormal speed condition is true or not.

According to embodiments of the present invention, the speed of the actuator is monitored on the basis of either one of position information written to the disk and information about the counter electromotive voltage of the voice coil motor. Accordingly, if an abnormal speed condition is detected, it is possible to judge on the basis of the other information whether the abnormal speed condition is true or not, and thereby to acquire the detection result of an abnormal condition with high reliability.

According to still another aspect of embodiments in accordance with the present invention, a control method is provided for controlling a disk drive, the disk drive comprising: a head that accesses a disk; and an actuator that supports the head and is driven by a voice coil motor, the method comprising the steps of: on the basis of position information written to the disk, monitoring the speed of the actuator while the actuator is being moved between a retraction area provided outside a data area of the disk and the disk; and if an abnormal speed condition of the actuator is detected, verifying whether the abnormal speed condition is true or not.

According to embodiments of the present invention, it is possible to provide a disk drive capable of verifying whether the speed of an actuator is true or not, the speed being detected while the actuator is being moved between a retracted position and a recording surface of a magnetic disk, and also to provide a control method for controlling the disk drive.

Embodiments of the present invention will be described as below. For clarification of the explanation, omission and simplification are made, where appropriate, in the following description and drawings. Also note that identical reference numerals are used to designate identical elements that are common to the figures, and that redundant description is omitted as appropriate for clarification of the explanation. As an example of disk devices, there are hard disk drives. Taking a hard disk drive (HDD) as an example, an embodiment of the present invention will described as below.

According to an embodiment, while an actuator is being moved between a retraction area outside a data area of a disk and the data area, the speed of the actuator is monitored on the basis of position information (servo data) written to the disk. Then, if an abnormal speed condition of the actuator is detected, this abnormal speed condition is verified on the basis of the counter electromotive voltage of a VCM. Thus, a check is made as to whether the detected abnormal speed condition of the actuator is true or not. To be more specific, by excluding the improper speed detection that is caused by misreading of servo data by a head, it becomes possible to detect that the abnormal speed condition is caused by the damage to the head or the disk. Only when it is also judged on the basis of the counter electromotive voltage that the detected abnormal speed is abnormal, the result of the judgment is recorded. This makes it possible to effectively use the result for the failure analysis and the like.

Figure 1:
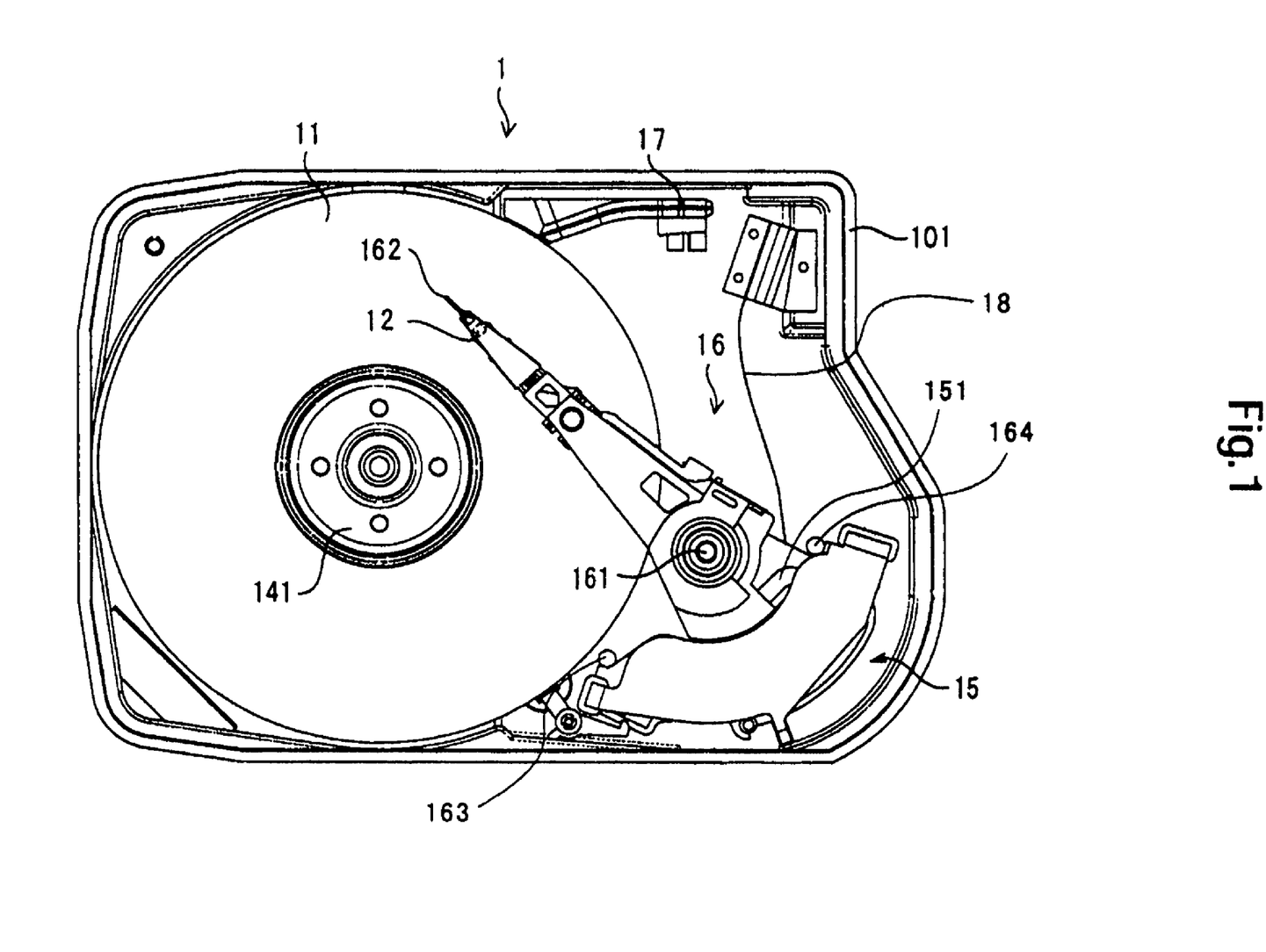
FIG. 1 is a diagram schematically illustrating an overall structural configuration of an HDD according to an embodiment of the present invention.

Here, first of all, an overall configuration of an HDD will be described for easier understanding of feature points of this embodiment. FIG. 1 is a diagram schematically illustrating a configuration of an HDD 1 according to this embodiment. FIG. 1 illustrates a state of the HDD 1 when a head slider 12 flies over a magnetic disk 11. In FIG. 1, the magnetic disk 11 is an example of a disk to which data is written. The magnetic disk 11 is a non-volatile recording disk to which data is written by magnetizing a magnetic layer thereof. As a result of securing a base 101 to a top cover (not illustrated) for covering an upper opening of the base 101 by use of a gasket (not illustrated), the base 101 forms a disk enclosure so that the disk enclosure accommodates and seals elements of the HDD 100.

The magnetic disk 11 is secured to a spindle motor (SPM) (not illustrated in the figure) by use of a clamp 141. The SPM rotates the magnetic disk 11 at specified angular speed. The head slider 12 accesses a recording area of the magnetic disk 11. The head slider 12, which is an example of a head, includes a head element, and a slider to which the head element is secured. The head element includes a read element for reading out data from the magnetic disk 11, and/or a write element for writing data to the magnetic disk 11.

An actuator 16 supports and moves the head slider 12. The actuator 16 is supported by a pivot shaft 161 so that the actuator 106 can pivotally move. The actuator 16 pivotally moves about the pivot shaft 161 in the radial direction of the magnetic disk 11 by the driving force of the VCM (voice coil motor) 15 that is a driving mechanism. As a result, the actuator 16 moves the head slider 12 to a desired position. The VCM 15 includes a voice coil 151 that is secured to the actuator 16. The VCM 15 is constituted of the voice coil 151 and two magnets (not illustrated in the figure) that are located on both sides of the voice coil 151 in a direction of the pivot shaft.

The HDD 1 according to this embodiment is a load/unload HDD, and includes a ramp 17 so that the head slider 12 can be retracted from a surface of the magnetic disk 11. The ramp 17 is located at a position in proximity to the outer circumference of the magnetic disk 11 By balancing the pressure produced by air viscosity between the rotating magnetic disk 11 and an ABS (Air Bearing Surface) surface of the slider, which faces the magnetic disk 11, against the force applied by the actuator 16 in a direction toward the magnetic disk 11, the head slider 12 flies over the magnetic disk 11.

However, if the rotation of the magnetic disk 11 stops, the head slider 12 touches the surface of the magnetic disk 11, and an absorption phenomenon occurs. This causes, for example, a flaw in a data area, and inability to rotate the magnetic disk. For this reason, while the magnetic disk 11 stops, or for the purpose of power saving, the actuator 16 unloads the head slider 12 from the surface of the magnetic disk 11 to retract the head slider 12 into the ramp 17.

At the time of unloading, the actuator 16 which supports the head slider 12 flying over the magnetic disk 11 pivotally moves towards the ramp 17 side. A tab 162 arrives at the end of the ramp 17 on the magnetic disk side, and rides on a sliding surface of the ramp 17. Further, the actuator 16 pivotally moves in a direction in which the actuator 16 is away from the magnetic disk 11 (unload direction). As a result, the tab 162 moves and slides on the sliding surface of the ramp 17. The tab 162 arrives at a stopping position on a stop surface of the ramp 17, and consequently the actuator 16 is latched. During a non-operating period, the actuator 16 stops at the stopping position on the ramp 17 in this manner. At the time of loading, the actuator 16 moves in reverse. Unloading and loading are executed by the speed feedback control of the VCM 15. This point will be described in detail later.

In addition, the HDD 1 includes an outer crash stop 163 and an inner crash stop 164, both of which define a pivoting range of the actuator 16. The outer crash stop 163 defines the pivoting range in an unload direction of the actuator 16 to prevent the actuator 16 from being away from the ramp 17 on the outer circumferential side. The inner crash stop 164 defines the pivoting range in a load direction of the actuator 16 to prevent the actuator 16 from colliding with the clamp 141 on the inner circumferential side.

Figure 2:
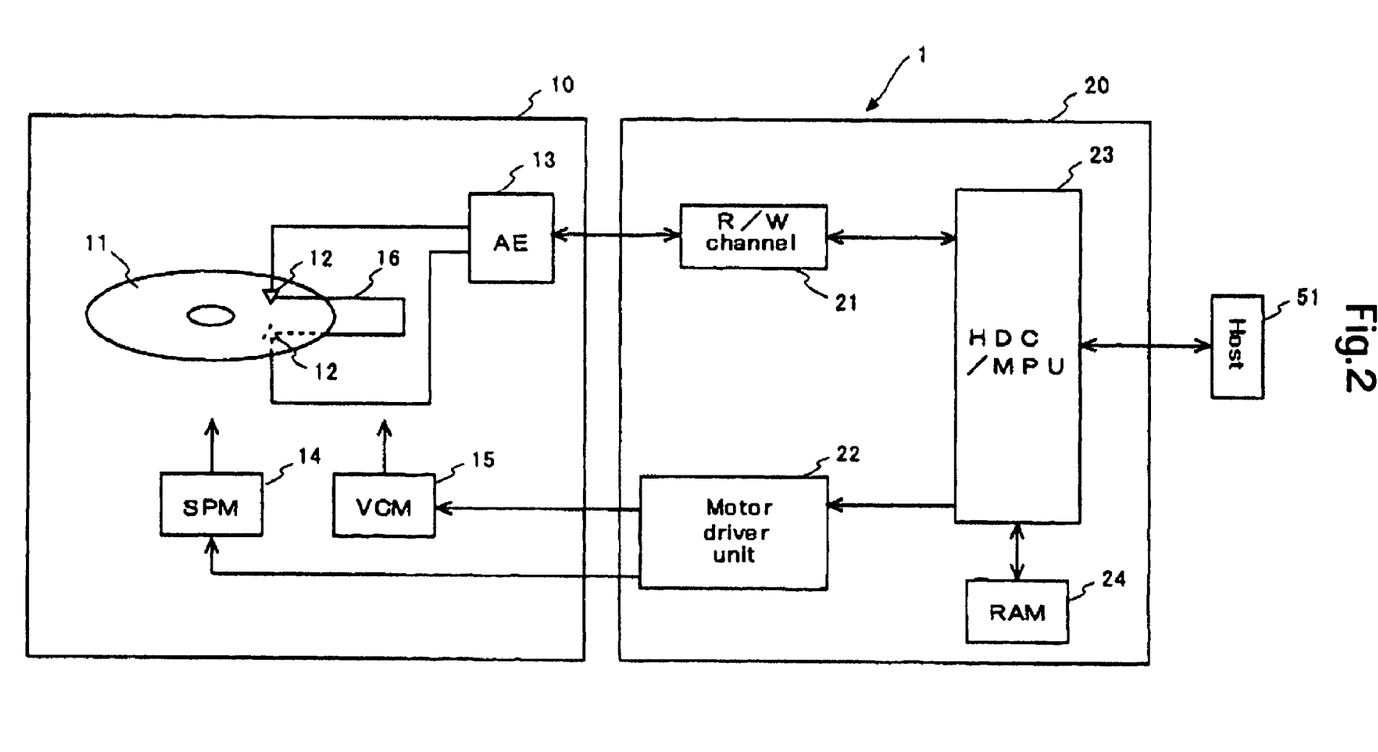
FIG. 2 is a block diagram schematically illustrating an overall functional configuration of an HDD according to an embodiment of the present invention.

A description will be made of the configuration for controlling the HDD 1 with reference to FIG. 2. As shown in FIG. 2, the HDD 1 includes a circuit board 20 that is secured outside an enclosure 10. On the circuit board 20, there are provided ICs including: a read/write channel (R/W channel) 21; a motor driver unit 22; an integrated circuit 23 including a hard disk controller (HDC) and an MPU (hereinafter referred to as "HDC/MPU"); a RAM 24; and a ROM (not illustrated in the figure). Incidentally, each circuit configuration may be mounted in a single IC or a plurality of ICs.

The motor driver unit 22 drives the SPM 14 according to control data sent from the HDC/MPU 23 that is an example of a controller. In addition, the motor driver unit 22 detects the VCM counter electromotive voltage and the VCM speed to control the speed of the VCM 15. The magnetic disk 11 shown in FIG. 2 has recording surfaces on both sides. Data is written to each of the recording surfaces. Head sliders 12 are provided for each recording surface. The motor driver unit 22 drives the VCM 15 according to control data (it is called DACOUT) that is received from the HDC/MPU 23.

It is to be noted that the required number of the magnetic disks 11 is one or more, and that a recording surface can be formed on one side, or both sides, of the magnetic disk 11. The AE 13 selects from the plurality of head sliders 12 that is used to access the magnetic disk 11. Further, the AE 13 amplifies (preamplifies) a read signal read by the selected head slider 12 and transmits the amplified signal to the RW channel 21. In addition, the AE 13 receives a write signal from the RW channel 21, and then transmits the write signal to the selected head slider 12.

During read processing, the RW channel 21 extracts data from a read signal supplied from the AE 13 to perform decode processing. Data which is read out includes user data and servo data. The decoded read user data is supplied to the HDC/MPU 23. Moreover, the RW channel 21 executes write processing according to a control signal received from the HDC/MPU 23. The RW channel 21 code-modulates write data supplied from the HDC/MPU 23, and then converts the code-modulated write data into a write signal to supply the write signal to the AE 13.

In the HDC/MPU 23, the MPU operates according to microcodes loaded into the RAM 24. When the HDD 1 is started up, not only microcodes to operate on the MPU but also data required for control and data processing are loaded into the RAM 24 from the magnetic disk 11 or a ROM. The HDC/MPU 23 executes processing required for data processing such as read/write processing control, management of command execution order, positioning control (servo control) of the head slider 12 by use of a servo signal, interface control, and defect control, and also executes the total control of the HDD 1.

Figure 3:
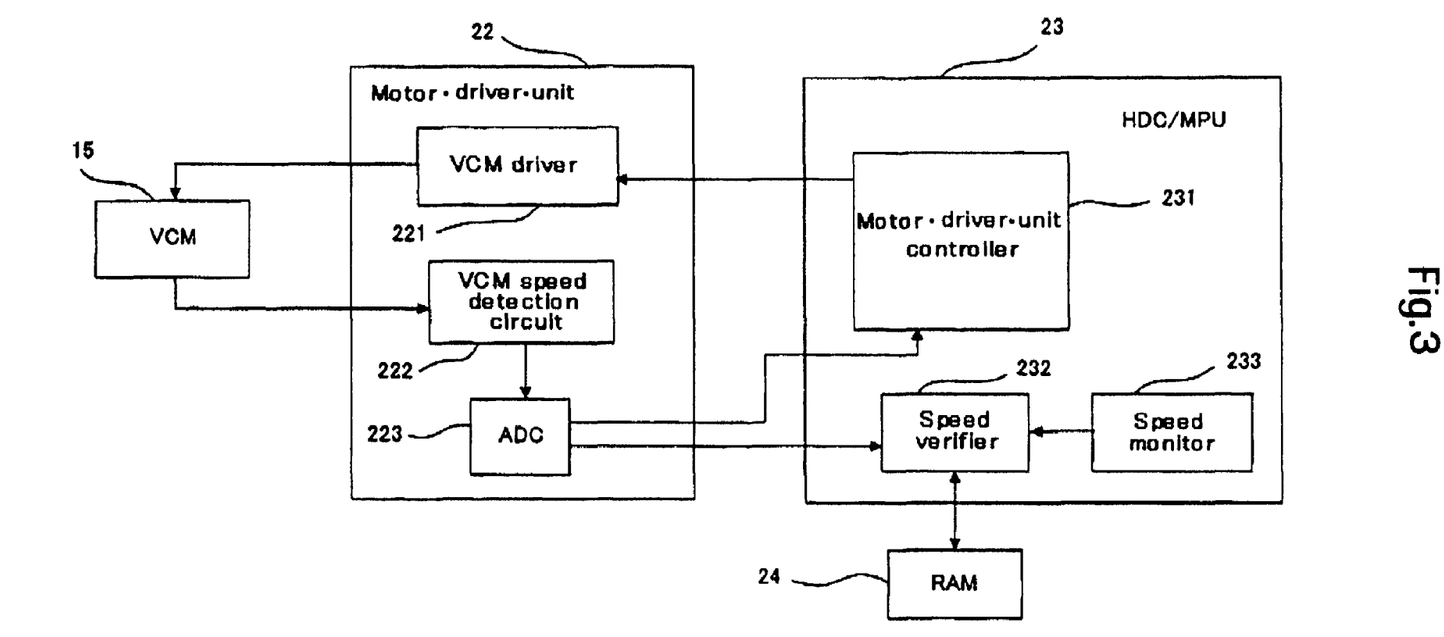
FIG. 3 is a block diagram illustrating extracted main parts for achieving a speed detection and verification function according to an embodiment of the present invention.

FIG. 3 is a segmentary view illustrating a processing part that performs verification on the basis of the abnormal speed detection according to this embodiment. At the time of load/unload processing, the HDC/MPU 23 controls the VCM 15 by the speed feedback control. As shown in FIG. 3, the motor driver unit 22 includes a VCM driver 221 for driving the VCM 15, and a VCM speed detection circuit 222 for detecting the VCM speed. In addition, the HDC/MPU 23 includes a motor driver unit controller 231 for performing the feedback control of the motor driver unit 22. The VCM speed detection circuit 222 detects the counter electromotive voltage of the VCM 15, and then outputs the VCM speed whose value is obtained by multiplying the counter electromotive voltage by a specified gain value. The output from the VCM speed detection circuit 222 is analog-to-digital converted by an AD converter (ADC) 223. Then, data indicating the detected VCM speed is transmitted to the motor driver unit controller 231 of the HDC/MPU 23. Incidentally, data transfer between the motor driver unit 22 and the HDC/MPU 23 is carried out by storing data in a register set included in the motor driver unit 22.

The motor driver unit controller 231 obtains a current value of the VCM speed from the motor driver unit 22, and then determines a value of the VCM current by use of this value and a target speed value so that the VCM speed becomes closer to the target speed. The motor driver unit controller 231 outputs, to the motor driver unit 22, data (DACOUT) that indicates the determined value of the VCM current. The VCM driver 221 of the motor driver unit 22 supplies the VCM 15 with the VCM current according to the control data (DACOUT) received from the motor driver unit controller 231. The VCM speed detection circuit 222 and the motor driver unit controller 231 execute the speed feedback processing of the VCM 15 at the time of the load/unload processing.

The HDC/MPU 23 according to this embodiment further includes a speed monitor 233 and a speed verifier 232. The speed monitor 233 monitors the speed of the actuator 16 while the actuator 16 is being moved between a data area of the disk 11 and the ramp 17 outside the data area (more specifically, at the time of loading/unloading) on the basis of servo data that is position information written to the disk 11. If the speed monitor 233 detects an abnormal speed condition of the actuator 16, the speed verifier 232 verifies the abnormal speed condition on the basis of the VCM speed stored in the ADC 223. As a result of the verification on the basis of the VCM speed, if it is judged that the abnormal speed condition is true, the speed verifier 232 stores, in the RAM 24, the abnormal speed (overspeed) and the number of times overspeeding has occurred. In the proper timing, this stored data is written to a spare area outside the data area to which user data of the disk 11 is written.

The spare area of the disk 11 is provided with a log area for storing the number of times the power has been turned on, the number of times of the latest spin-up, and the like. The number of times overspeeding has occurred (the number of times of overspeeding) and the overspeed are also written to the log area. By writing the information to the log area, it is possible to use the information in question for the inspection and failure analysis of a product, and the like. The damage to the head and the disk 11 may occur in the HDD 1. The information about the overspeed and the number of times of overspeeding can be used to judge whether or not such damage has occurred at the time of loading.

Incidentally, this embodiment is based on the assumption that the overspeed and the number of times of overspeeding are written to the log area. However, as described below, the overspeed in question is not caused by a failure to read out position information on the disk 11. Therefore, it is thought that overspeeding is actually occurring. Accordingly, on the basis of this result, it is also possible to use the information for the other purposes, for example, adjustment of a value of the VCM speed.

Figure 4:
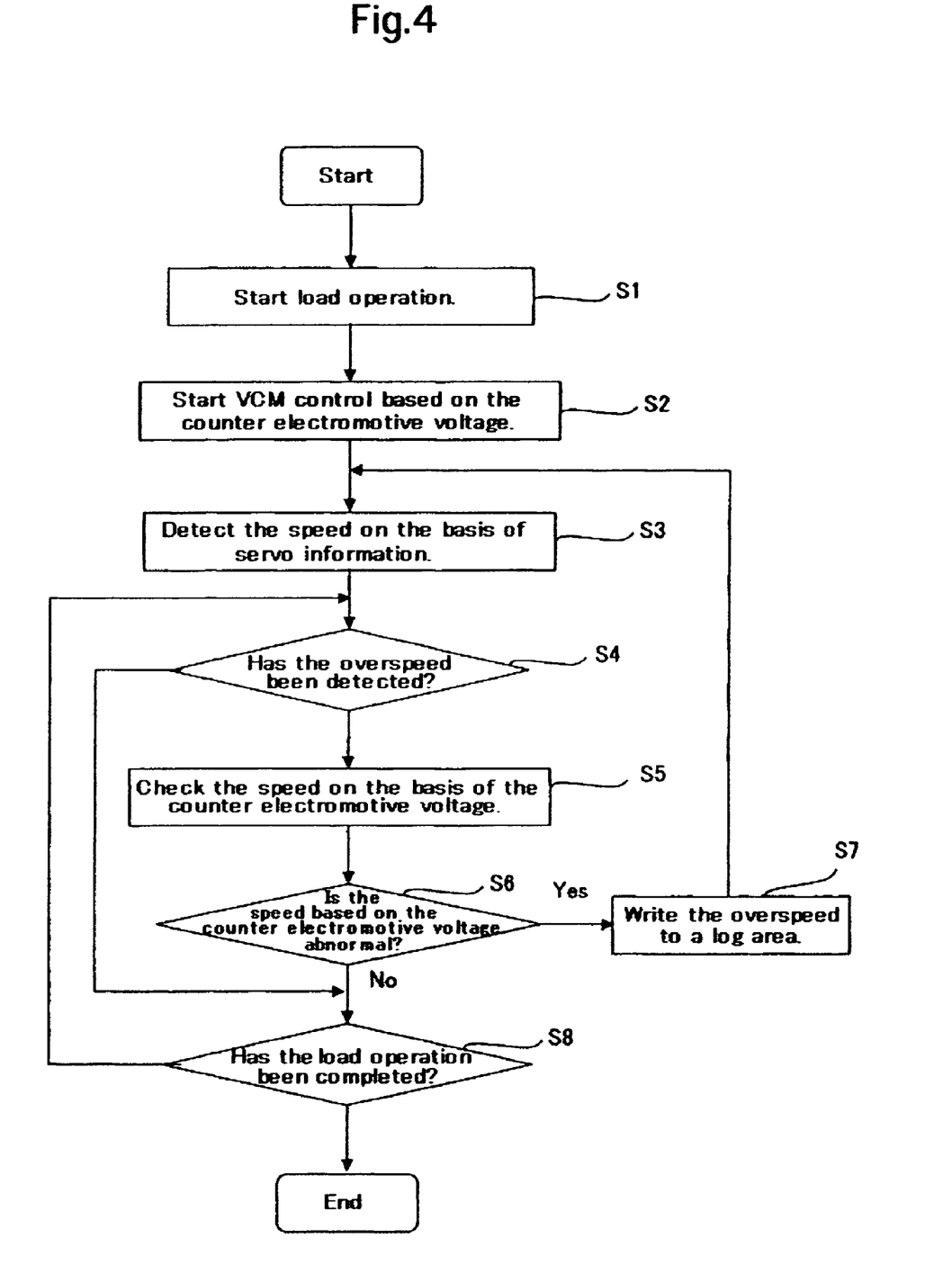
FIG. 4 is a flowchart illustrating the speed detection and verification operation according to an embodiment of the present invention.

Taking as an example the operation of detecting the transmission speed at the time of loading, verifying the transmission speed, and logging the result, the operation of an HDD according to this embodiment will be described as below. FIG. 4 is a flowchart illustrating the processing up to the logging. First of all, load operation is started (step S1). As soon as the load operation starts, the feedback control in the motor driver unit controller 231, the VCM driver 221 and the VCM speed detection circuit 222 is performed (step S2)

Here, when the head moves to a position on a recording surface of the disk 11, the loading is completed after a lapse of time during which it becomes possible to stably read out servo data. At this point of time, the feedback control based on the counter electromotive voltage is switched to the positioning control based on servo data. Until the loading is completed, the HDD 1 samples cylinder ID information that is written to the disk 11. Then, every time the cylinder ID information is read out, the speed of the actuator 16 is calculated, and a judgment is made as to whether or not the speed exceeds a reference value (step S3). For example, the reference value can be set to twice the target speed (target). If the speed is larger than the reference value, it is judged that overspeeding occurs.

After that, if the speed which has been detected on the basis of a cylinder ID exceeds the reference value, more specifically, if the overspeed is detected (step S4: Yes), the speed verifier 232 checks the VCM speed that is stored in the ADC 223 (step S5). Here, if the speed based on the counter electromotive voltage (VCM speed) also exceeds the reference values (step S6: Yes), the overspeed is written to the log area (step S7). Here, the number of times overspeeding has occurred is also counted. Accordingly, not only the overspeed but also the number of times of overspeeding is written to the log area. The above information is temporarily stored in the RAM 24, and is then written in the log area of the disk 11 in the proper timing.

After the overspeed and the number of times of overspeeding are written, the process returns to the step S3 again. Then, the load operation is executed until a cylinder ID is successively read out the specified number of times (for example, ten times) to monitor overspeeding during this period of time. If the cylinder ID is successfully read out ten times without overspeeding being detected, the loading is completed (step S8). Then, the VCM speed control based on the counter electromotive voltage is switched to the positioning control based on servo data.

Incidentally, this embodiment is based on the assumption that the reference value with which the speed detected on the basis of a cylinder ID is judged to be abnormal is twice the target speed. However, the present invention is not limited to this. In addition, the abnormal VCM speed can also be detected by use of the same reference value as above, that is to say, twice the target speed. However, the reference value used to judge whether or not the VCM speed is abnormal may differ from that used to judge whether or not the detected speed based on a cylinder ID is abnormal.

In this embodiment, during normal operation, overspeeding of the actuator at the time of loading is monitored by sampling the cylinder ID information to calculate the load speed every time. If the load speed exceeds the reference value, whether or not the load speed is truly abnormal is verified on the basis of the VCM speed obtained from the counter electromotive voltage of the VCM. This makes it possible to eliminate overspeeding caused by misreading of a cylinder ID by the head, and thereby to write, to the log area, only overspeeding that actually occurs. Therefore, on the basis of the information about overspeeding, it is possible to judge whether or not the damage to the disk has occurred at the time of loading.

Up to this point, specific embodiments of the present invention have been described as examples. However, the present invention is not limited to the above-described embodiments. Those skilled in the art will be able to easily make modifications, additions and alterations to each element of the above embodiments within the scope of the present invention. For example, embodiments of the present invention can be applied to disk drives other than HDDs. Moreover, it is also possible to apply embodiments of the present invention to an HDD equipped with a head slider that includes only a read element or a write element.

Furthermore, although this embodiment was described on the assumption that the speed at the time of loading was monitored by sampling cylinder IDs, another method may also be adopted. For example, the VCM speed may be monitored on the basis of the counter electromotive voltage, and if an abnormal speed condition is detected, verification may be performed using the result of the speed detection results based on cylinder ID information to check whether the detected abnormal speed condition is true or not.

What is claimed is:

1. A disk drive comprising:
a head that accesses a disk;
an actuator that supports the head and is driven by a voice coil motor;
a speed monitor configured to detect an abnormal speed condition of the actuator, the speed monitor also configured to monitor, on the basis of position information written to the disk, the speed of the actuator while the actuator is performing a load operation where the actuator is being moved between a retraction area provided outside a data area of the disk and the disk; and
a speed verifier that verifies, if an abnormal speed condition of the actuator is detected by the speed monitor, whether the abnormal speed condition is true or not wherein the speed of the actuator is monitored during a lapse of time when actuator is positioned above the disk but prior to completing the load operation.

2. The disk drive according to claim 1, wherein on the basis of whether or not position information written to the disk has been successfully read out by the head, the speed verifier verifies whether the abnormal speed condition is true or not.

3. The disk drive according to claim 1, further comprising a motor driver for controlling the voice coil motor on the basis of the counter electromotive voltage of the voice coil motor, wherein if an abnormal speed condition is detected, the speed verifier verifies, on the basis of the counter electromotive voltage, whether the abnormal speed condition is true or not.

4. The disk drive according to claim 3, wherein:
the speed monitor monitors the speed of the actuator as a first speed on the basis of the position information; and
the speed verifier detects a second speed on the basis of the counter electromotive voltage, and if both of the first speed and the second speed exceed a reference value, the first speed is recorded as the abnormal speed.

5. The disk drive according to claim 1, wherein on the basis of the result of the verification, the speed verifier stores the speed as the abnormal speed.

6. The disk drive according to claim 1, wherein the retraction area is a ramp that is provided outside the disk.

7. The disk drive according to claim 1, wherein the speed monitor monitors the speed of the actuator while position information written to the disk is read out the specified number of times with the head being moved from the retraction area.

8. A disk drive comprising:
a head that accesses a disk;
an actuator that supports the head and is driven by a voice coil motor;
a speed monitor configured to detect an abnormal speed condition of the actuator, the speed monitor also configured to monitor the speed of the actuator during a load operation while the actuator is being moved between a retraction area provided outside a data area of the disk and the disk; and
a speed verifier that verifies, if an abnormal speed condition of the actuator is detected by the speed monitor, whether the abnormal speed condition is true or not, wherein:
the speed monitor monitors the speed of the actuator on the basis of either one of position information written to the disk and the counter electromotive voltage of the voice coil motor; and
the speed verifier verifies, on the basis of the other one of the position information written to the disk and the counter electromotive voltage of the voice coil motor, whether the abnormal speed condition is true or not;
wherein the speed monitor monitors the speed of the actuator during a lapse of time when the actuator is positioned above the disk but prior to completing the load operation.

9. A control method for controlling a disk drive, the disk drive comprising:
a head that accesses a disk; and
an actuator that supports the head and is driven by a voice coil motor,
the method comprising the steps of:
on the basis of position information written to the disk, monitoring the speed of the actuator during a load operation and while the actuator is being moved between a retraction area provided outside a data area of the disk and the disk; and
if an abnormal speed condition of the actuator is detected, verifying whether the abnormal speed condition is true or not;
wherein the speed monitor monitors the speed of the actuator during a lapse of time when the actuator is positioned above the disk but prior to completing the load operation.

10. The control method for controlling a disk drive according to claim 9, the control method further comprising the step of:

on the basis of the result of the verification, determining whether or not the speed is stored as the abnormal speed.

11. The control method for controlling a disk drive according to claim 9, wherein:

if an abnormal speed condition is detected, the speed verifier verifies, on the basis of the counter electromotive voltage of the voice coil motor, whether the abnormal speed condition is true or not.

12. The control method for controlling a disk drive according to claim 11, the control method further comprising the steps of:

on the basis of position information written to the disk, monitoring the speed of the actuator as a first speed;

if the first speed exceeds a reference value, detecting a second speed on the basis of the counter electromotive voltage; and if the second speed exceeds the reference value, recording the first speed as the abnormal speed.

13. The control method for controlling a disk drive according to claim 9, the control method further comprising the step of:

monitoring the speed of the actuator during load operation in which the head is moved from a ramp provided outside the disk to the disk.

* * * * *